United States Patent
Noh et al.

(10) Patent No.: US 11,515,783 B2
(45) Date of Patent: Nov. 29, 2022

(54) POWER SUPPLY DEVICE, POWER SUPPLY SYSTEM AND METHOD FOR CONTROLLING THE SAME

(71) Applicant: SAMSUNG ELECTRO-MECHANICS CO., LTD., Suwon-Si (KR)

(72) Inventors: Young Seung Noh, Suwon-Si (KR); Kwang Soo Choi, Suwon-Si (KR); Bo Mi Lee, Suwon-Si (KR); Chan Sung Jang, Suwon-Si (KR)

(73) Assignee: CSIP CONSULTING LTD., Seoul (KR)

( * ) Notice: Subject to any disclaimer, the term of this patent is extended or adjusted under 35 U.S.C. 154(b) by 0 days.

(21) Appl. No.: 14/273,444

(22) Filed: May 8, 2014

(65) Prior Publication Data
US 2015/0115931 A1    Apr. 30, 2015

(30) Foreign Application Priority Data
Oct. 31, 2013  (KR) .................... 10-2013-0131602

(51) Int. Cl.
*H02M 3/335*    (2006.01)
*H02M 3/04*     (2006.01)
(Continued)

(52) U.S. Cl.
CPC ......... *H02M 3/04* (2013.01); *H02M 3/33507* (2013.01); *G06F 1/26* (2013.01); *H02M 1/0025* (2021.05)

(58) Field of Classification Search
CPC ............... H02M 3/04; H02M 3/33507; H02M 2001/0025; H02M 1/0025; H02M 1/0009;
(Continued)

(56) References Cited

U.S. PATENT DOCUMENTS 5,886,424 A    3/1999  Kim
6,452,362 B1   9/2002  Choo
(Continued)

FOREIGN PATENT DOCUMENTS

CN    1175721 A    3/1998
CN    1282010 A    1/2001
(Continued)

OTHER PUBLICATIONS

Korean Office Action dated Jan. 31, 2020 in corresponding Korean Patent Application No. 10-2019-0060573 (7 pages in Korean).
(Continued)

*Primary Examiner* — Thienvu V Tran
*Assistant Examiner* — Shahzeb K Ahmad
(74) *Attorney, Agent, or Firm* — NSIP Law (57) ABSTRACT

A power supply system may include a target device and an adapter. The target device may include an adapter connection switch that receives adapter recognition information to form a connection with the adapter, a voltage detection unit that receives an output voltage from an adapter, and a voltage-change-requesting unit that outputs a voltage to request a voltage change based on information on the output voltage from the adapter. The adapter may include a device information recognition unit that receives the voltage to request a voltage change, and an output-voltage-changing unit that changes the output voltage based on the voltage to request a voltage change.

15 Claims, 10 Drawing Sheets

(51) Int. Cl.
*H02M 1/00* (2006.01)
*G06F 1/26* (2006.01)

(58) Field of Classification Search
CPC .... H02M 1/0045; H02M 1/0048; H02M 1/34;
H02M 3/10; H02M 3/157; H02M 3/335;
H02J 7/02; G06F 1/266; G06F 1/26;
G06F 13/4022
USPC ........................................................ 323/351
See application file for complete search history.

(56) References Cited

U.S. PATENT DOCUMENTS

| | | | | |
|---|---|---|---|---|
| 7,375,492 | B2 * | 5/2008 | Calhoon | G06F 1/26 320/106 |
| 7,378,817 | B2 * | 5/2008 | Calhoon | G06F 1/26 320/106 |
| 8,358,100 | B2 | 1/2013 | Helfrich | |
| 2003/0172312 | A1 | 9/2003 | Takahashi et al. | |
| 2008/0218130 | A1 | 9/2008 | Guo et al. | |
| 2009/0001937 | A1 | 1/2009 | Densham et al. | |
| 2010/0064148 | A1 * | 3/2010 | Ho | H02J 1/00 713/300 |
| 2010/0231185 | A1 * | 9/2010 | Yu | H01R 31/06 323/282 |
| 2010/0293302 | A1 | 11/2010 | Fujii et al. | |
| 2011/0260689 | A1 * | 10/2011 | Kano | H02J 7/0022 320/128 |
| 2012/0206947 | A1 | 8/2012 | Haight et al. | |
| 2012/0212078 | A1 * | 8/2012 | Lanni | H02J 1/00 307/151 |
| 2013/0019113 | A1 * | 1/2013 | Yamaya | G06F 1/266 713/300 |
| 2013/0313903 | A1 * | 11/2013 | Kayama | H02J 1/00 307/26 |
| 2014/0312691 | A1 * | 10/2014 | Doljack | H02J 7/0036 307/29 |
| 2014/0368159 | A1 * | 12/2014 | Han | H02M 3/155 320/107 |

FOREIGN PATENT DOCUMENTS

| | | | | |
|---|---|---|---|---|
| CN | 101604858 | A | 12/2009 | |
| CN | 101604860 | A | 12/2009 | |
| CN | 102055223 | A | 5/2011 | |
| CN | 102570546 | A | 7/2012 | |
| CN | 102684512 | A | 9/2012 | |
| EP | E P-2381571 | A2 * | 10/2011 | ............. G01L 1/205 |
| JP | 2003-263245 | A | 9/2003 | |
| JP | 2004-78740 | A | 3/2004 | |
| JP | 2010-267221 | A | 11/2010 | |
| JP | 2013-25345 | A | 2/2013 | |
| KR | 10-0645770 | B1 | 11/2006 | |
| KR | 10-2007-0006969 | A | 1/2007 | |
| KR | 10-2009-0031085 | A | 3/2009 | |
| KR | 10-2012-0130794 | A | 12/2012 | |
| WO | WO 2010/039656 | A1 | 4/2010 | |

OTHER PUBLICATIONS

Chinese Office Action dated Jun. 3, 2020 in corresponding Chinese Patent Application No. 201811301312.0 (12 pages in Chinese).
Korean Notice of Allowance dated Jul. 2, 2021 in counterpart Korean Patent Application No. KR 10-2020-0135599 (2 pages in Korean).
Chinese Office Action dated Feb. 2, 2021 in counterpart Chinese Application No. 201811301312.0 (12 pages in Chinese).
Korean Office Action dated Nov. 29, 2021, in counterpart Korean Patent Application No. 10-2021-0092759 (8 pages in Korean).

\* cited by examiner

POWER SUPPLY DEVICE, POWER SUPPLY SYSTEM AND METHOD FOR CONTROLLING THE SAME

CROSS-REFERENCE TO RELATED APPLICATION

This application claims the benefit of Korean Patent Application No. 10-2013-0131602 filed on Oct. 31, 2013, with the Korean Intellectual Property Office, the disclosure of which is incorporated herein by reference.

BACKGROUND

The present disclosure relates to a power supply system including a general-purpose power supply device.

Recently, portable electronic devices have tended to be operated systemically and wirelessly, to provide multimedia services, and to be digitalized, "smart" and relatively complex. In particular, multimedia services are increasingly attracting popular interest, and accordingly, multimedia services provided by small, portable devices have come to prominence.

Among portable electronic devices, as mobile devices such as smartphones and tablet personal computers (PCs) are prominent as information technology devices, new technology requirements for driving power supplying devices such as adapters for charging batteries in such mobile devices have also been increased.

Previously, only the standby power of driving power supply devices has been specified. However, as many features, including touchscreens, have been added to mobile devices, it has become necessary to reduce the influence of such device elements on mobile devices while driving power supply devices are charging such mobile devices.

As mobile devices are diversified in terms of the available types thereof, it is necessary to supply power to different mobile devices having different power specifications using a single power supply device. Accordingly, research into a power supply devices applicable to different mobile devices ongoing.

That is, different mobile devices have different rated voltages, and thus require dedicated power supply devices. For this reason, not to mention the cost burden, users have to carry as many power supply devices as they do mobile devices.

As a solution to solve such problems, setting a common input voltage for mobile devices at, 5 V, for example, may be contemplated. In such a solution, however, a laptop computer, for example, may require a high level of input power and thus consume a large amount of current, such that a separate heat dissipation device may be required to dissipate heat generated in the device.

In such a case, the volume of the power supply device is inevitably increased along with manufacturing costs thereof.

In the case that output voltage from the power supply device is set to be 12 V, even though the current may be decreased, it may force devices (such as smartphones) that have low input voltage and employ small and cheap elements to employ elements having higher withstand voltage levels to handle the increased input voltage. This results in an increase in manufacturing costs, as elements having higher withstand voltages are generally more expensive than elements having lower withstand voltages. Therefore, it may be difficult to use a power supply device that supplies power having a single voltage level to various devices.

Patent Documents 1 and 2 listed below relate to a unified power supply device. However, such a unified power supply device includes power supply circuits for supplying various levels of voltage, so that the volume of the device is increased and thus manufacturing costs are increased.

Therefore, in order to overcome the above problems, a novel power supply device is required that can be used for various devices.

RELATED ART DOCUMENT (Patent Document 1) Korean Patent Laid-Open Publication No. 2009-0031085
(Patent Document 2) Korean Patent Laid-Open Publication No. 2007-0006969

SUMMARY

An aspect of the present disclosure may provide a general-purpose power supply system that can be used for a variety of devices requiring driving power having different voltage and current levels.

According to an aspect of the present disclosure, a power supply system may include: a target device and an adapter, the target device including an adapter connection switch that receives adapter recognition information to form a connection with the adapter, a voltage detection unit that receives an output voltage from the adapter, and a voltage-change-requesting unit that outputs a signal to request a voltage change based on information on the output voltage from the adapter; and the adapter including a device information recognition unit that receives the signal to request a voltage change, and an output-voltage-changing unit that changes the output voltage based on the signal to request a voltage change.

The voltage-change-requesting unit in the target device may be connected to the device information recognition unit in the adapter via a USB data cable.

The adapter may further include an adapter information output unit that outputs adapter information to the target device.

The target device may further include a control unit operably connected to the adapter connection switch, the voltage detection unit and the change-requesting unit.

The adapter may further include a control unit operably connected to the device information recognition unit and the output-voltage-changing unit.

The device information recognition unit may include voltage-dividing resistors to detect a level of a voltage in the USB data cable.

According to another aspect of the present disclosure, a power supply system may include a target device and an adapter, the target device including an adapter connection switch that receives adapter recognition information to form a connection with the adapter, a voltage detection unit that receives an output voltage from an adapter, and a voltage-change-requesting unit that outputs a voltage to request a voltage change based on information on the output voltage from the adapter; and the adapter including a device information recognition unit that receives the voltage to request a voltage change, and an output-voltage-changing unit that changes the output voltage based on the voltage to request a voltage change.

The voltage-change-requesting unit in the target device may be connected to the device information recognition unit in the adapter via a USB data cable, and the device information recognition unit may include voltage-dividing resistors to detect a level of a voltage in the USB data cable.

According to another aspect of the present disclosure, a method for controlling a power supply system may include: determining whether a device is connected at a first time point and at a second time point; determining a specification for supplying power based on whether the device is connected at the first time point and on whether the device is connected at the second time point; and supplying power based on the specification for supplying power.

The determining of the specification for supplying power may include: receiving the signal to request a voltage change to change the specification for supplying power, if it is determined that the device is connected at the first time point and that the device is disconnected at the second time point.

The determining of the specification for supplying power may include: maintaining the specification for supplying power, if it is determined that the device is connected at the first time point and that the device is connected at the second time point.

According to another aspect of the present disclosure, a power supply device may include: a USB data cable; a device information recognition unit that includes voltage-dividing resistors and receives a signal to request a voltage change from a target device via the USB data cable; and an output-voltage-changing unit that changes an output voltage based on the signal to request a voltage change.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. Throughout the drawings, the same or like reference numerals will be used to designate the same or like elements.

Figure 1:
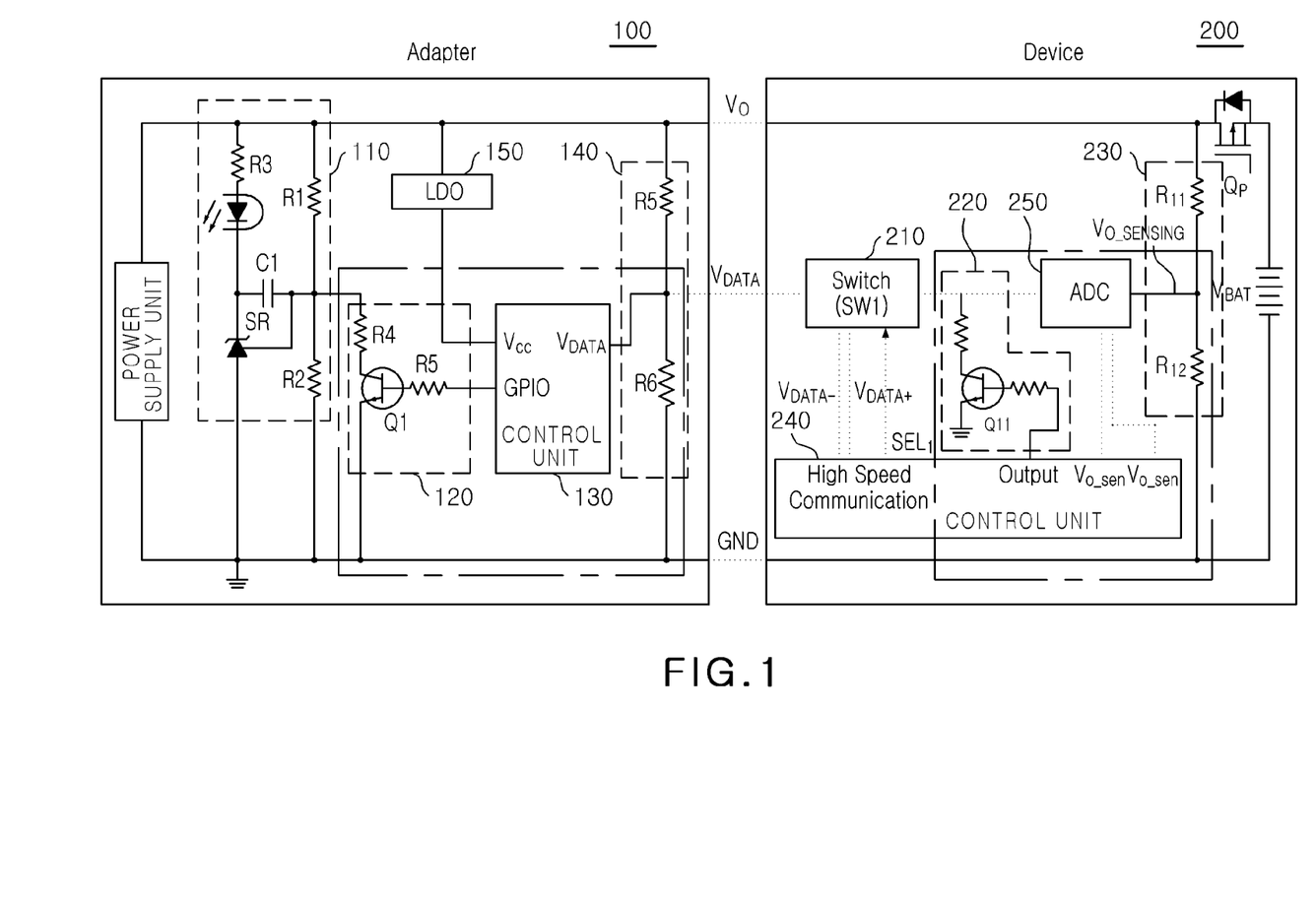
FIG. 1 is a diagram of a power supply system according to an exemplary embodiment of the present disclosure.

FIG. 1 is a diagram of a power supply system according to an exemplary embodiment of the present disclosure.

Referring to FIG. 1, the power supply system may include an adapter 100, and a target device 200.

The target device 200 may be an electronic device which receives power from the adapter 100 to charge a battery therein.

The target device 200 may include an adapter connection switch 210, a voltage detection unit 230, a voltage-change-requesting unit 220, a control unit 240, and an analog-to-digital converter (ADC) 250.

The control unit 240 may be operably connected to the adapter connection switch 210, the voltage detection unit 230, the voltage-change-requesting unit 220, and the ADC 250, so that it may control the adapter connection switch 210, the voltage detection unit 230, the voltage-change-requesting unit 220, and the ADC 250.

The adapter connection switch 210 may receive adapter recognition information and may form a connection with an adapter. The adapter recognition information may include information as to whether an adapter is connected to a target device.

That is, if an adapter is connected to a target device, the target device recognizes that the device connected thereto is an adapter and then may switch on the adapter connection switch. For example, the target device may recognize that the connected device is an adapter based on information on a USB data cable.

The voltage detection unit 230 may receive an output voltage from an adapter. The voltage detection unit 230 may include voltage-dividing resistors R11 and R12. The voltage detection unit 230 may detect an output voltage Vo from an adapter divided by the voltage-dividing resistors R11 and R12.

In this manner, the target device may receive the output voltage from the adapter.

The control unit 240 may check whether the output voltage from an adapter is equal to the rated voltage of the target device. If the output voltage from the adapter is equal to the rated voltage of the target device, a pass switch Qp is turned on so that a battery may be supplied with power.

If the output voltage from the adapter is not equal to the rated voltage of the target device, the target device 200 may output a signal to request a voltage change to the adapter 100.

The voltage-change-requesting unit 220 may output the signal to request a voltage change based on the output voltage from the adapter. That is, the voltage-change-requesting unit 220 may output a voltage to request a voltage change based on the output voltage from the adapter.

The voltage-change-requesting unit 220 may include a resistor and a switch Q11. The switch Q11 may be connected between ground and a connection node between the adapter connection switch 210 and the ADC 250. Depending on switching of the switch Q11, the level of the voltage output from the voltage-change-requesting unit may be changed.

The adapter 100 may be connected to the target device 200 via a USB data cable $V_{DATA}$. Further, the voltage-change-requesting unit 220 in the device may be connected to a device information recognition unit 140 in the adapter via the adapter connection switch 210 and the USB data cable $V_{DATA}$.

The voltage-change-requesting unit 220 may output the signal to request a voltage change and the voltage to request a voltage change via the USB data cable $V_{DATA}$.

As described above, in the power supply system according to the exemplary embodiment of the present disclosure, information can be transmitted between the adapter and the target device via the existing USB data cable $V_{DATA}$, without employing any additional signal cable.

The ADC 250 may receive a signal from the voltage detection unit 230 and the adapter connection switch 210 and may transmit it to the control unit.

The adapter 100 may include a power supply unit, an output unit 110, an output-voltage-changing unit 120, a control unit 130, the device information recognition unit 140, and a low-dropout regulator (LDO) 150.

The power supply unit may change input power into driving power having a predetermined voltage level so as to supply it.

The output unit 110 may change the voltage of the power from the power supply unit. The power with changed voltage may be regulated via a voltage regulator SR, in which a reference voltage is set by resistors R1 and R2, and then it is output.

The device information recognition unit 140 may receive a signal to request a voltage change from the target device. Specifically, the device information recognition unit 140 may detect a change in the level of the voltage output from the voltage-change-requesting unit in the target device. In other words, the device information recognition unit 140 may detect a change in the voltage on the USB data cable $V_{DATA}$.

The device information recognition unit 140 may include voltage-dividing resistors R5 and R6. The device information recognition unit 140 may detect the voltage on the USB data cable which has been divided by the voltage-dividing resistors R5 and R6.

The output-voltage-changing unit 120 may change the output voltage based on the signal to request a voltage change.

The output-voltage-changing unit 120 may include resistors R4 and R5 and a switch Q1. The resistor R4 may be connected to the output unit 110 in parallel.

Depending on switching of the switch Q1, the level of the voltage output from the adapter may be changed.

The control unit 130 may be operably connected to the device information recognition unit 140 and to the output-voltage-changing unit and may control the device information recognition unit 140 and the output-voltage-changing unit.

Figure 2:
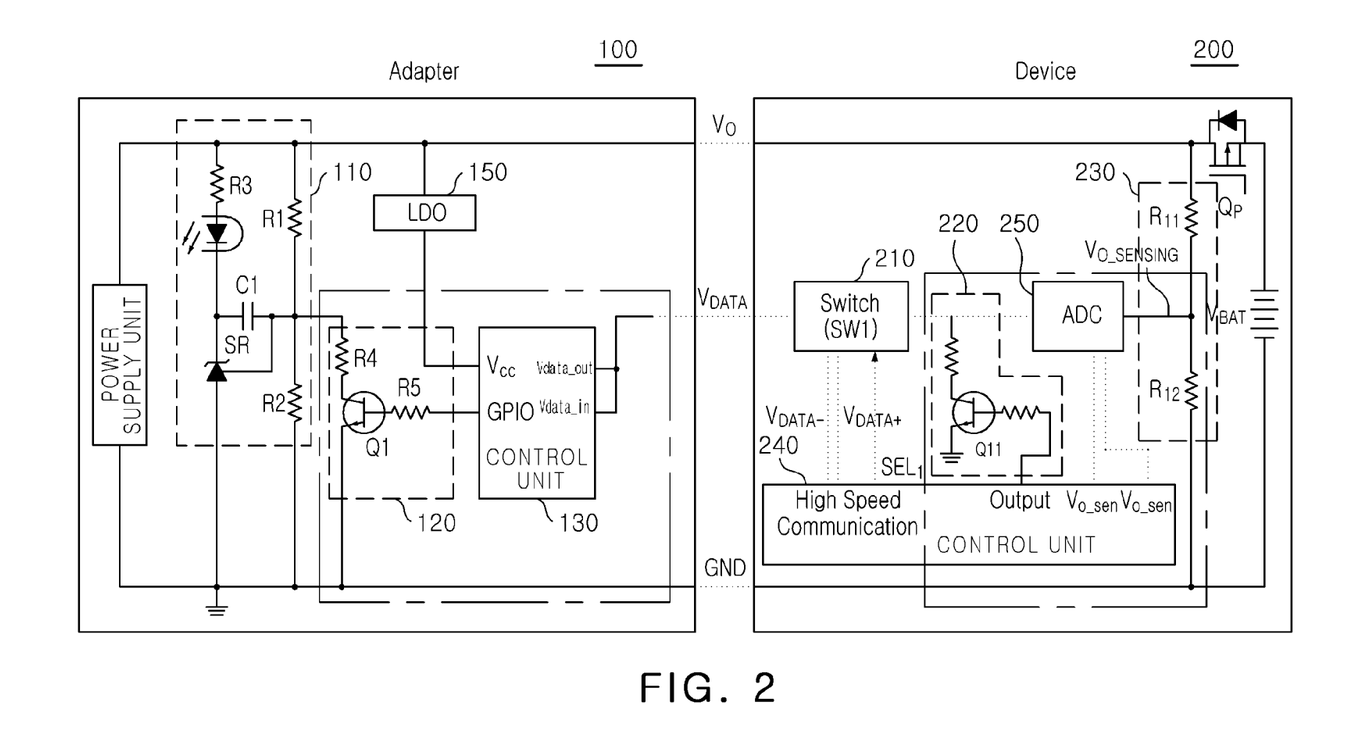
FIG. 2 is a diagram of a power supply system according to another exemplary embodiment of the present disclosure.

FIG. 2 is a diagram of a power supply system according to another exemplary embodiment of the present disclosure.

The power supply system shown in FIG. 2 is identical to the system shown in FIG. 1, except for the control unit 130. Other elements than the control unit 130 have been described above and, therefore, will not be described again.

Referring to FIG. 2, the control unit 130 may replace the device information recognition unit 140 shown in FIG. 1. According to this exemplary embodiment, the resistors used in the device information recognition unit 140 are eliminated, and device information is recognized by resistors in the control unit 130. Therefore, the number of used resistors may be reduced.

Figure 3:
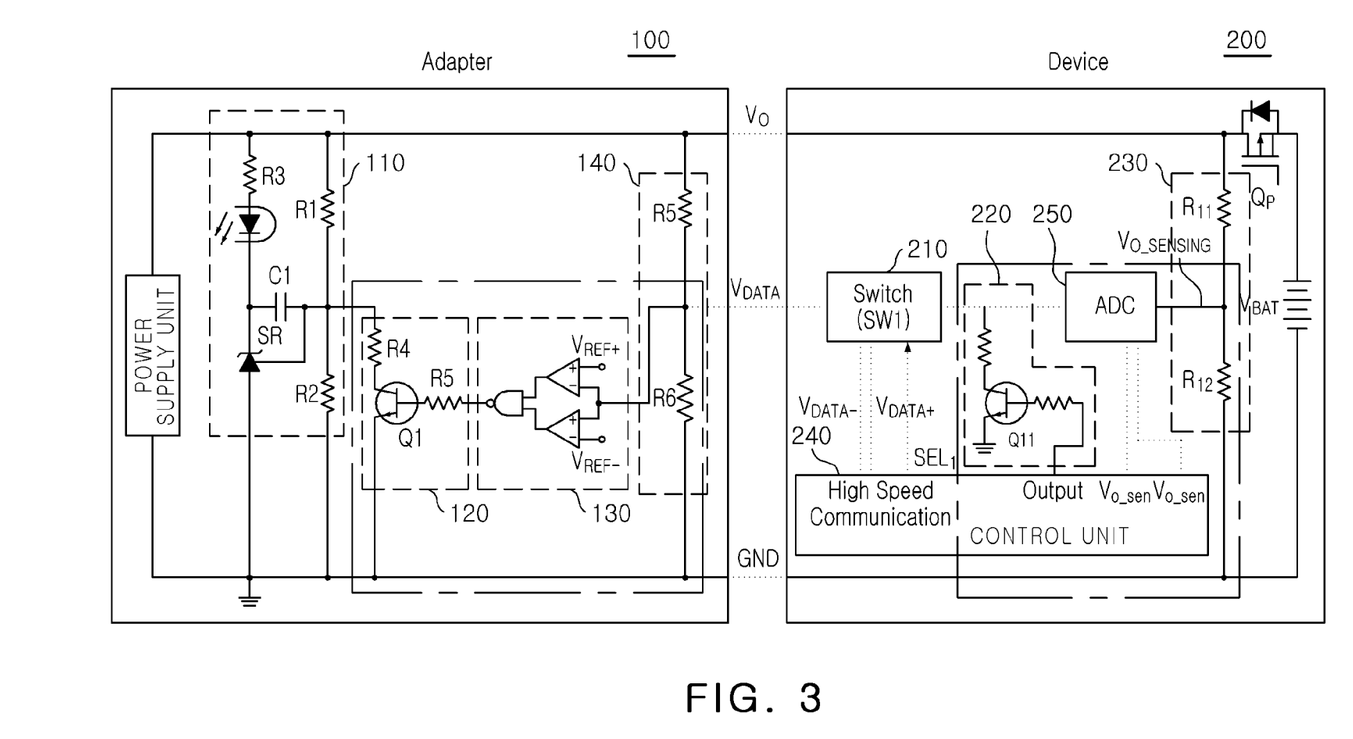
FIG. 3 is a diagram of a power supply system according to another exemplary embodiment of the present disclosure.

FIG. 3 is a diagram of a power supply system according to another exemplary embodiment of the present disclosure.

The power supply system shown in FIG. 3 is identical to the system shown in FIG. 1, except for the control unit 130. Other elements than the control unit 130 have been described above and, therefore, will not be described again.

The control unit 130 may include a plurality of comparators and a NAND logic circuit. The control unit 130 may output different signals when it receives a voltage within a predetermined range, i.e., $V_{REF-}$ and $V_{REF+}$ and when it receives a voltage out of the predetermined range, i.e., $V_{REF-}$ and $V_{REF+}$.

Accordingly, the control unit 130 may not operate the output-voltage-changing unit 120 while the target device is being supplied with a rated voltage. Further, the control unit 130 may operate the output-voltage-changing unit 120 while the target device is not being supplied with a rated voltage.

Figure 4:
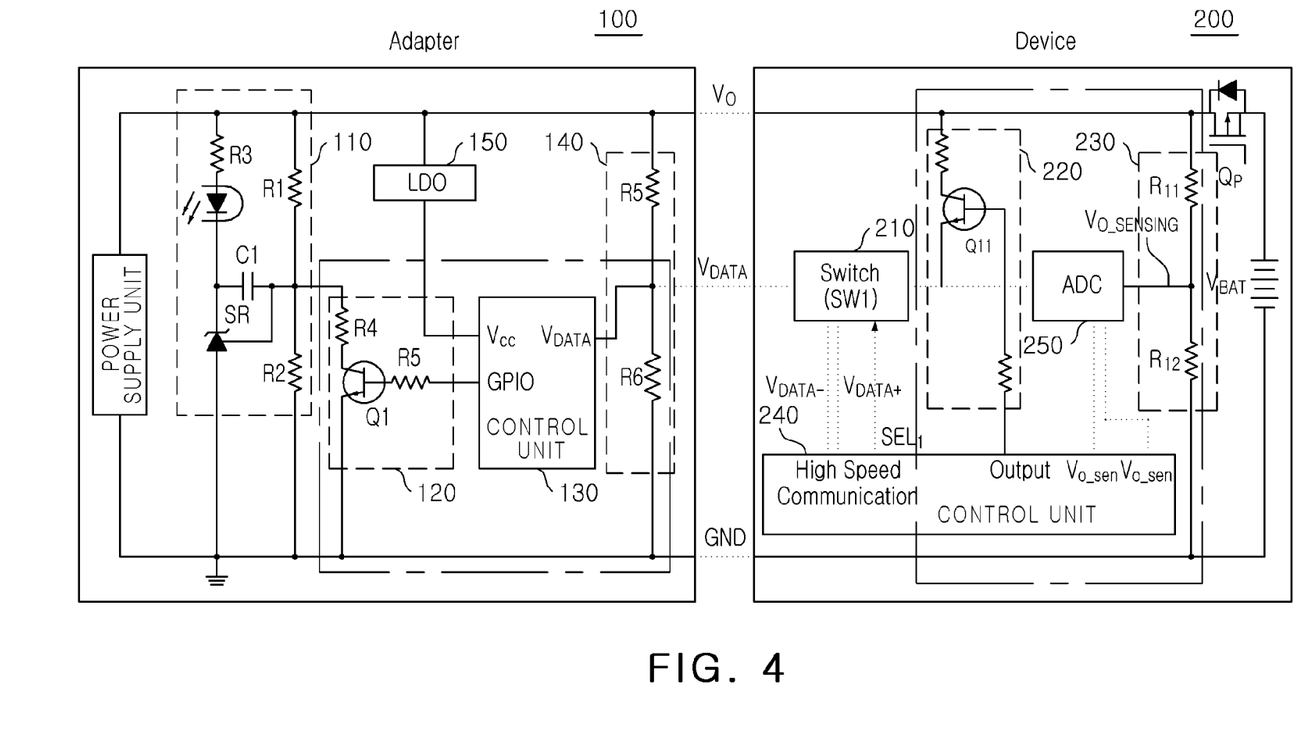
FIG. 4 is a diagram of a power supply system according to another exemplary embodiment of the present disclosure.

FIG. 4 is a diagram of a power supply system according to another exemplary embodiment of the present disclosure.

The power supply system shown in FIG. 4 is identical to the system shown in FIG. 1, except for the voltage-change-requesting unit 220. Other elements than the voltage-change-requesting unit 220 have been described above and, therefore, will not be described again.

The voltage-change-requesting unit 220 may include a resistor and a switch Q11. The switch Q11 may be connected between an output cable Vo and a connection node between the adapter connection switch 210 and the ADC 250. Depending on switching of the switch Q11, the level of the voltage output from the voltage-change-requesting unit may be changed.

Figure 5:
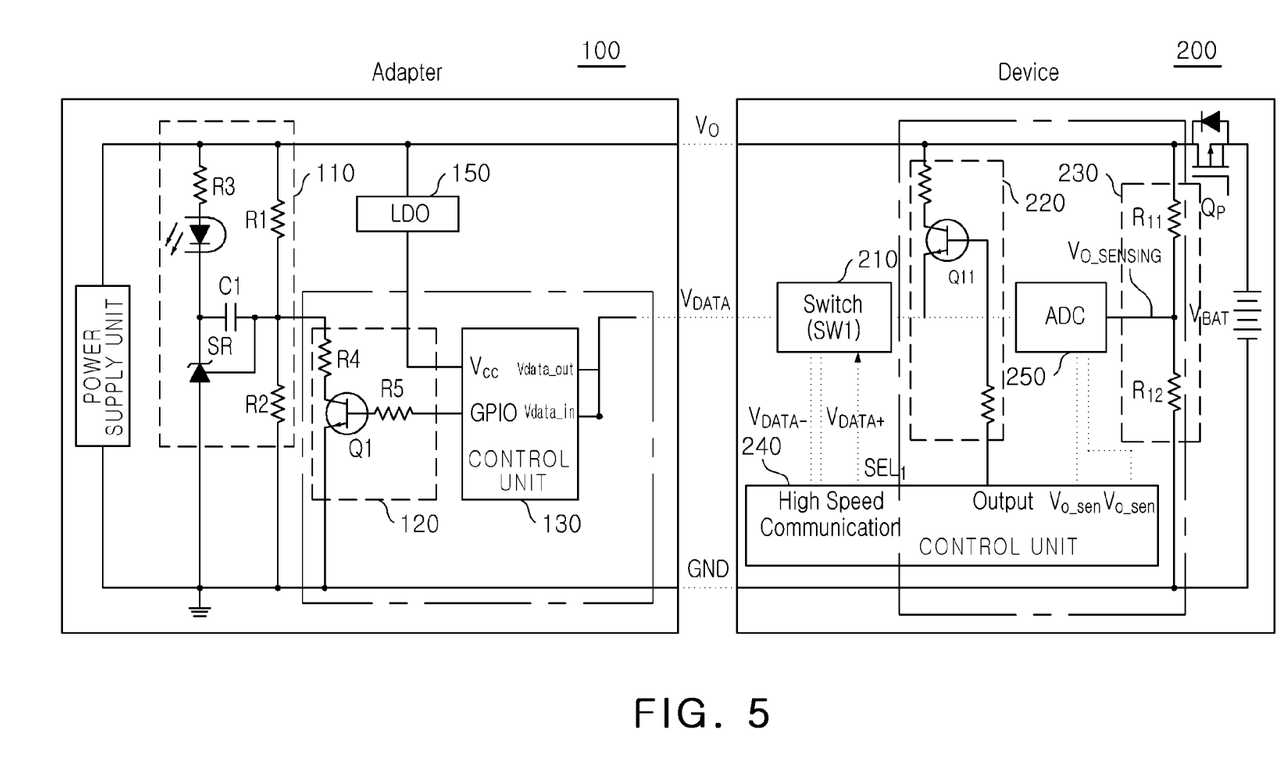
FIG. 5 is a diagram of a power supply system according to another exemplary embodiment of the present disclosure.

FIG. 5 is a diagram of a power supply system according to another exemplary embodiment of the present disclosure.

The power supply system shown in FIG. 5 is identical to the system shown in FIG. 4, except for the control unit 130. Other elements than the control unit 130 have been described above and, therefore, will not be described again.

Referring to FIG. 5, the control unit 130 may replace the device information recognition unit 140 shown in FIG. 4. According to this exemplary embodiment, the resistors used in the device information recognition unit 140 are eliminated, and device information is recognized by resistors in the control unit 130. Therefore, the number of used resistors may be reduced.

Figure 6:
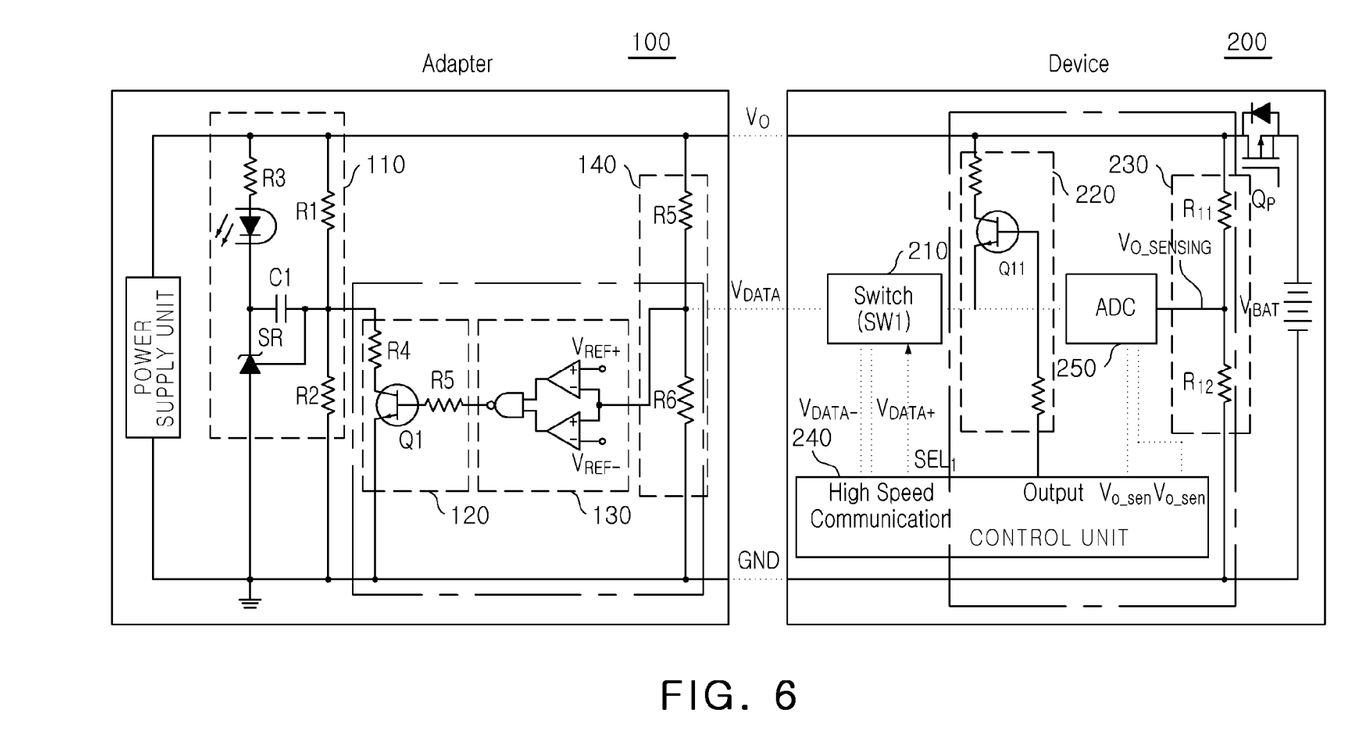
FIG. 6 is a diagram of a power supply system according to another exemplary embodiment of the present disclosure.

FIG. 6 is a diagram of a power supply system according to another exemplary embodiment of the present disclosure.

The configuration of the power supply system shown in FIG. 6 will be apparent to those skilled in the art based on the descriptions given with respect to the FIGS. 1, 2, 3 and 4 and, therefore, will not be described.

Figure 7:
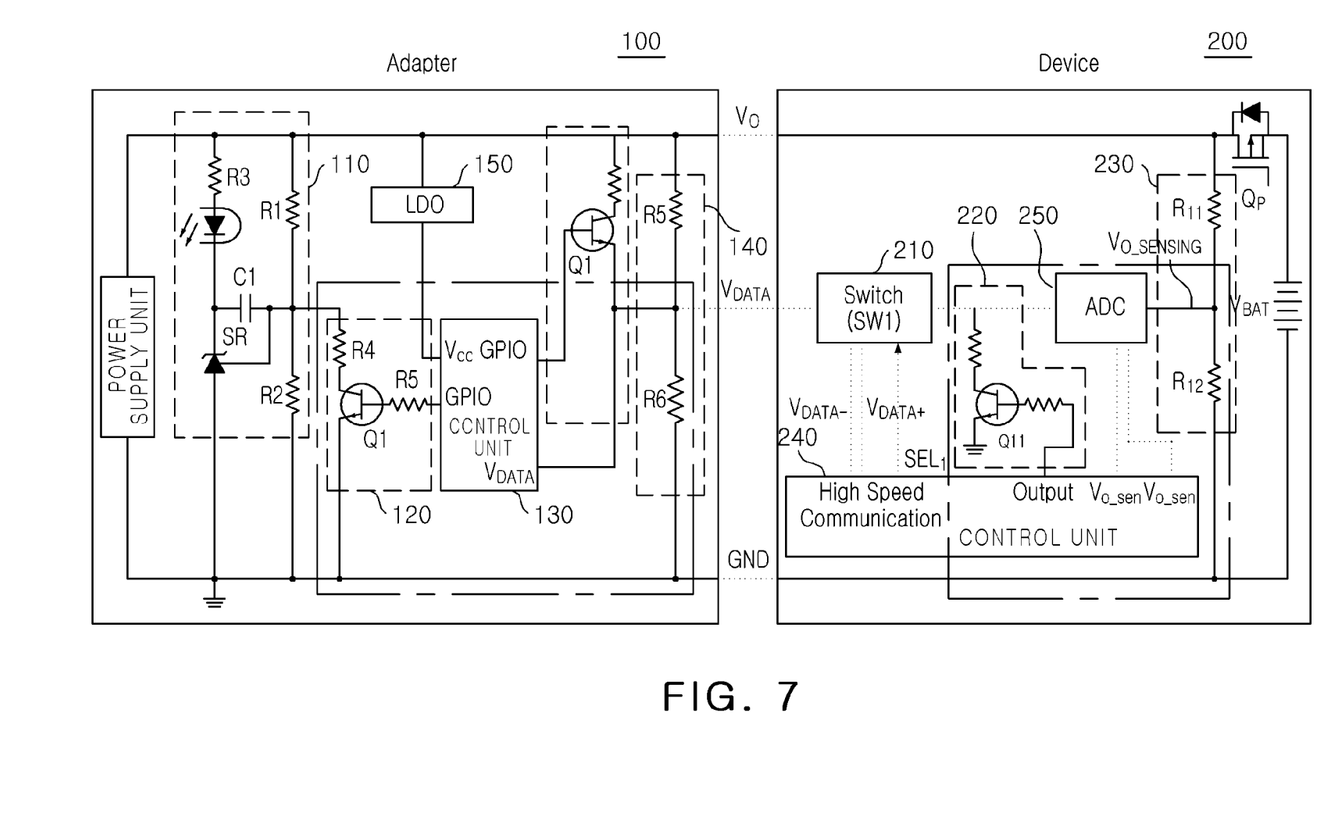
FIG. 7 is a diagram of a power supply system according to another exemplary embodiment of the present disclosure.

FIG. 7 is a diagram of a power supply system according to another exemplary embodiment of the present disclosure.

The power supply system shown in FIG. 7 is identical to the system shown in FIG. 1, except for an adapter information output unit 160. Other elements than the adapter information output unit 160 have been described above and, therefore, will not be described again.

The adapter information output unit 160 may output adapter information to a target device. The adapter information may indicate that the adapter is a variable-output adapter.

When an adapter is connected to a target device, the adapter information output unit 160 may output adapter information to the target device.

The adapter information output unit 160 may include a resistor and a switch Q2. The switch Q2 and the resistor may be connected to each other in series and may be connected to the device information recognition unit 140 in parallel.

Depending on switching of the switch Q2, the level of the voltage on a USB data cable $V_{DATA}$ may be changed.

Accordingly, the adapter information output unit 160 may deliver the adapter information to the target device via the USB data cable $V_{DATA}$.

As described above, in the power supply system according to the exemplary embodiment of the present disclosure, information can be transmitted between the adapter and the target device via the existing USB data cable $V_{DATA}$, without employing any additional signal cable.

Figure 8:
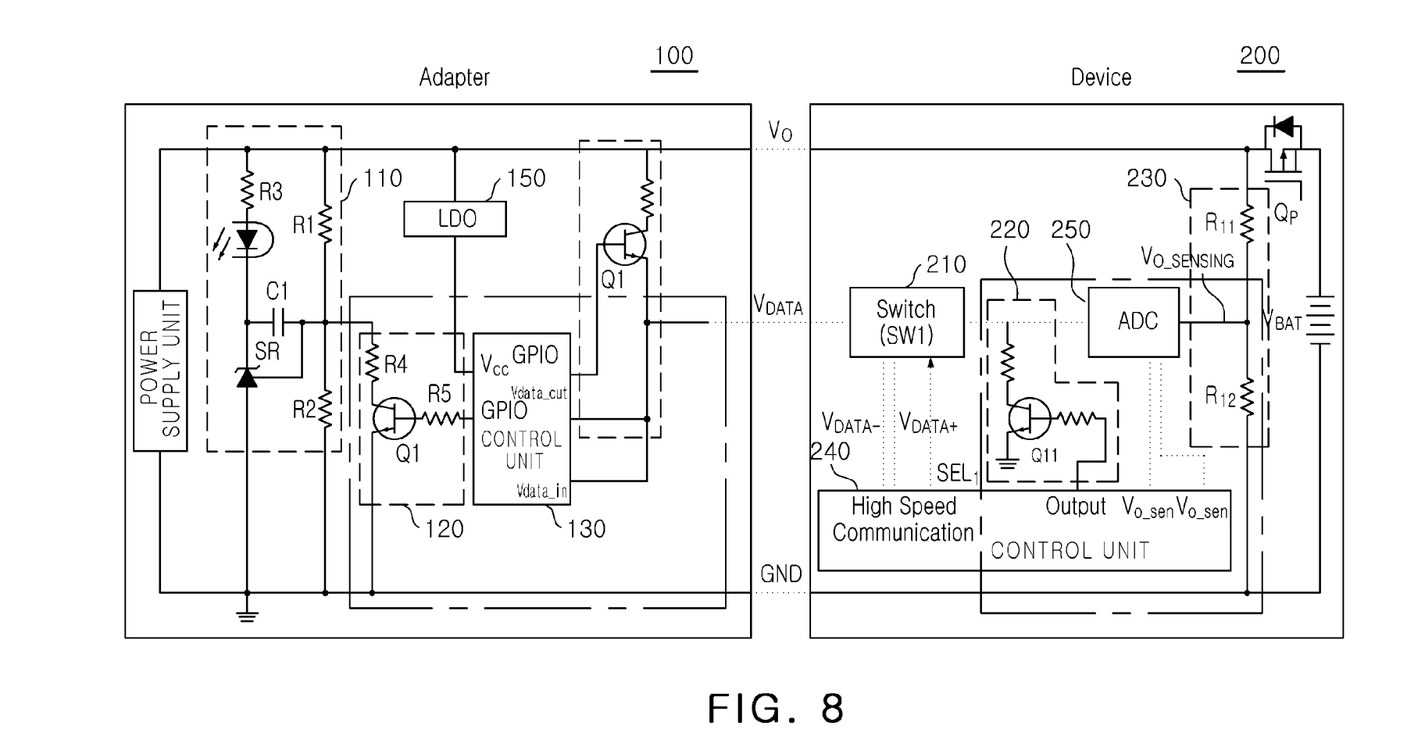
FIG. 8 is a diagram of a power supply system according to another exemplary embodiment of the present disclosure.

FIG. 8 is a diagram of a power supply system according to another exemplary embodiment of the present disclosure.

The power supply system shown in FIG. 8 is identical to the system shown in FIG. 7, except for the control unit 130. Other elements than the control unit 130 have been described above and, therefore, will not be described again.

Referring to FIG. 8, the control unit 130 may replace the device information recognition unit 140 shown in FIG. 7. According to this exemplary embodiment, the resistors used in the device information recognition unit 140 are eliminated, and device information is recognized by resistors in the control unit 130. Therefore, the number of used resistors may be reduced.

In this regard, the control unit 130 shown in FIGS. 1, 2, 4, 5, 7 and 8 may be a controller in the adapter to transmit/receive signals and to change an output voltage.

Further, the control unit 240 shown in FIGS. 1, 2, 4, 5, 7 and 8 may be an IC to implement the inherent function of the device or may be a separate IC to perform voltage detection, voltage-change request or the like, as described above.

The control unit 130 shown in FIGS. 3 and 6 may be implemented in an analog manner and may diversify output voltage by adding circuits such as a comparator, a logic gate, a flip-flop and the like if more voltages are required by the device.

Figure 10:
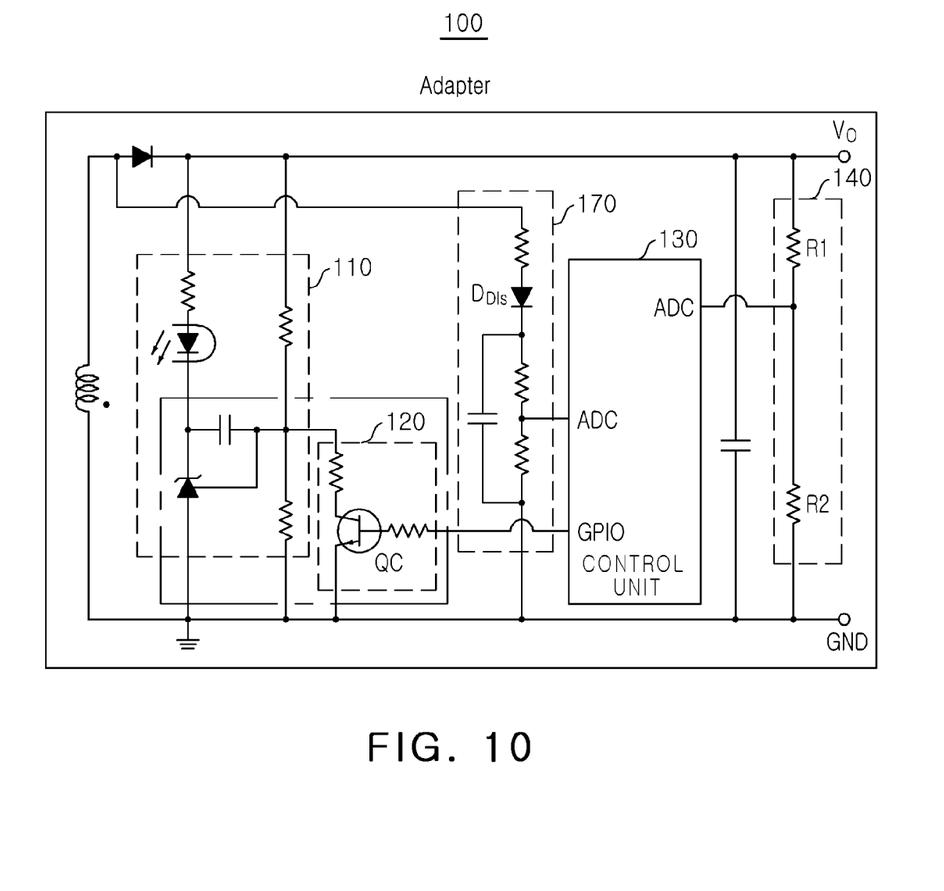
FIG. 10 is a circuit diagram of an adapter according to another exemplary embodiment of the present disclosure.

FIG. 10 is a circuit diagram of an adapter according to another exemplary embodiment of the present disclosure.

The adapter shown in FIG. 10 is identical to the adapter shown in FIG. 1, except for a disconnection-detecting unit 170. Other elements than the disconnection-detecting unit 170 have been described above and, therefore, will not be described again.

The disconnection-detecting unit 170 may include a diode $D_{DIS}$, resistors and a capacitor.

The level of the average input voltage of the diode $D_{DIS}$ may be different depending on the state of a target device. Depending on the state of the device, the duty cycle of and frequency of a DC/DC converter are changed, and accordingly the average input voltage of the diode $D_{DIS}$ may be changed.

After the average input voltage is rectified by the diode $D_{DIS}$, it is filtered by the capacitor having small capacitance, and then a DC value reflecting the state of a load may be detected. By using this value, disconnection of the device can be detected.

Figure 9:
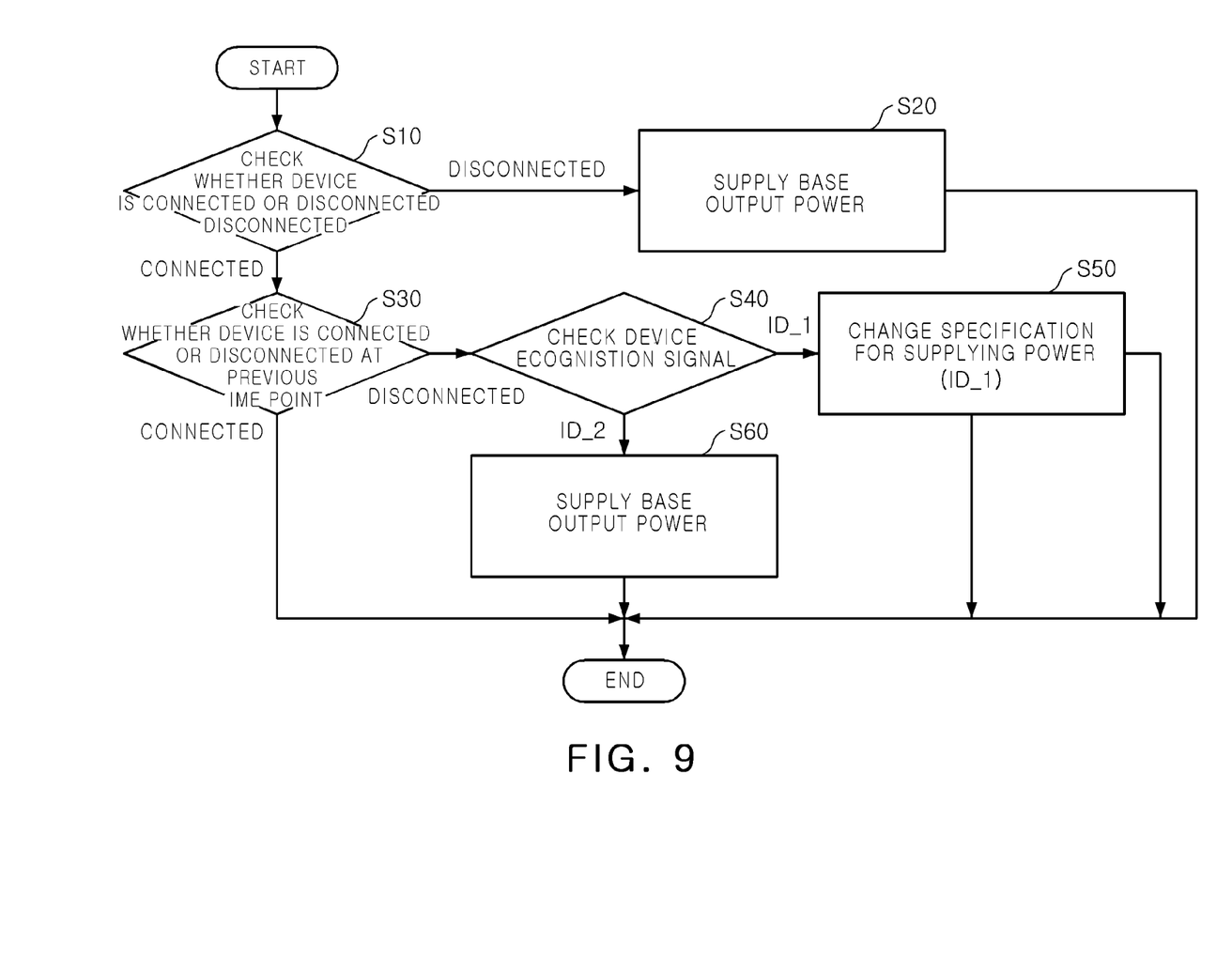
FIG. 9 is a flowchart for illustrating a method for controlling a power supply system according to an exemplary embodiment of the present disclosure.

FIG. 9 is a flowchart for illustrating a method for controlling a power supply system according to an exemplary embodiment of the present disclosure.

Referring to FIG. 10, the adapter may check whether the device is disconnected therefrom (S10). In doing so, the disconnection-detecting unit 170 shown in FIG. 9 may be used.

If it the adapter is disconnected from the device, the adapter may output base output power (S20).

If the adapter is connected to the device, the adapter may check whether the adapter was disconnected from the device at a previous time point (S30).

That is, according to the method for controlling a power supply system according to the exemplary embodiment of the present disclosure, it may be determined whether the device is connected to the adapter at first and second time points. The second time point is earlier than the first time point.

If the adapter is connected to the device at the first time point and at the second time point, the adapter does not change its output voltage.

In the related art, while an adapter supplies power to a device after they are connected to each other and mutually check recognition signals, the recognition signals may be distorted due to a change in the state of the device or introduction of noise. When this happens, the adapter may supply power to the device based on the erroneously recognized signal. At this time, an error occurs in the device and the device may be damaged, unless a separate protection circuit is operated in the device.

In the method for controlling a power supply system according to the exemplary embodiment of the present disclosure, however, it is determined whether the device is connected at the first time point and the second time point, and then it is determined whether to change the output power. Therefore, the specification for supplying power is not changed, even if distortion in a recognition signal or a reception error occurs, until a previously connected device is disconnected from an adapter and then another device having different specification is connected to the adapter. Additionally, damage to the device due to excessive power supplied thereto can be prevented.

If the adapter is connected to the device at the first time point and is disconnected from the device at the second time point, the adapter may detect a device recognition signal (S40). The device recognition signal refers to the signal to request a voltage change, which is described above.

According to an exemplary embodiment of the present disclosure, the adapter may change the specification for supplying power based on the device recognition signal (S50 and S60).

According to the method for controlling a power supply system, errors in supplying power caused by erroneously recognizing signals can be reduced. Further, according to the method for controlling a power supply system, operational stability of a general-purpose power supply device can be improved.

In addition, the method for controlling a power supply system according to the exemplary embodiment does not require any additional cable and thus can save cost.

As set forth above, according to exemplary embodiments of the present disclosure, a general-purpose power supply system that can be used for a variety of devices having different voltage and current levels of driving power can be provided.

While exemplary embodiments have been shown and described above, it will be apparent to those skilled in the art that modifications and variations could be made without departing from the spirit and scope of the present disclosure as defined by the appended claims.

What is claimed is:

1. A power supply device, which is configured to be disconnected from a power receiving device, the power supply device comprising:
   a voltage port for supplying a voltage to the power receiving device;
   a ground port for matching a ground potential of the power receiving device with the power supply device;
   a voltage change request port for receiving, from the power receiving device, a voltage change request signal to change the voltage supplied from the voltage port, the voltage change request port being provided separately from the voltage port;

a device information recognition unit for detecting the voltage change request signal received from the power receiving device through the voltage change request port;

a control unit configured to generate a control signal for changing the voltage, which is a different rated voltage from a previous rated voltage, according to the voltage change request signal input through the voltage change request port;

an output-voltage-changing unit configured to change the voltage, which is a different rated voltage from a previous rated voltage, according to the control signal; and an adapter information output unit configured to output information regarding a type of the power supply device to the power receiving device through the voltage change request port, wherein the type of the power supply device indicates that the power supply device is an output-voltage variable adapter, and wherein, the voltage port, the ground port, and the voltage change request port are universal serial bus (USB) ports configured to be connected to a USB connector.

2. The power supply device of claim 1, wherein the device information recognition unit includes voltage-dividing resistors.

3. A power receiving device, which is configured to be disconnected from a power supply device, the power receiving device comprising:

a voltage port for receiving a voltage from the power supply device;

a ground port for matching a ground potential of the power receiving device with the power supply device;

a voltage change request port for transmitting, to the power supply device, a voltage change request signal to change the voltage, the voltage change request port being provided separately from the voltage port;

a voltage detection unit for detecting a voltage level supplied through the voltage port;

a control unit configured to determine whether the voltage level, detected by the voltage detection unit, is the same as a rated voltage, and to generate a control signal for requesting a change of the voltage of the power supply device in a case in which the voltage level, detected by the voltage detection unit, is not the same as the rated voltage;

an adapter connection switch configured to selectively connect the voltage change request port to the control unit; and a voltage-change-requesting unit configured to output the voltage change request signal to the power supply device through the voltage change request port, the voltage-change-requesting unit comprising a switch mechanism for changing a bias level of the voltage change request port based on the control signal.

4. The power receiving device of claim 3, wherein the voltage port, the ground port, and the voltage change request port are universal serial bus (USB) ports to be connected to a USB connector.

5. The power receiving device of claim 3, further comprising:

a battery; and a pass switch configured to selectively transmit the voltage to the battery through the voltage port, wherein the control unit is configured to turn on the pass switch in such a manner that the voltage is transmitted to the battery when the voltage, detected by the voltage detection unit, is the same as the rated voltage, and the voltage detection unit comprises voltage-dividing resistors including a first resistor and a second resistor, wherein the first resistor is coupled between the voltage port and the control unit, and the second resistor is coupled between the control unit and the ground port.

6. The power receiving device of claim 3, wherein the adapter connection switch is configured to selectively connect the voltage change request port to the control unit to perform two-way communication between the power receiving device and the power supply device.

7. The power receiving device of claim 3, wherein the adapter connection switch is configured to selectively connect $V_{DATA+}$ and $V_{DATA-}$ signals, connected to the control unit, to the voltage change request port.

8. The power receiving device of claim 3, wherein the adapter connection switch is configured to selectively connect the control signal for requesting a change of the voltage of the power supply device to the voltage change request port.

9. A power supply system including a power supply device connected to a power receiving device through a universal serial bus (USB) cable and configured to supply two or more output voltages to the power receiving device according to a request of the power receiving device, the power receiving device including:

a first USB connection port including a first voltage port, a first ground port, and a first voltage change request port for connection to the USB cable;

a voltage detection unit configured to detect a voltage level supplied through the first voltage port;

a first control unit configured to determine whether the voltage level, detected by the voltage detection unit, is the same as a rated voltage of the power receiving device, and to generate a first control signal for requesting a change of the voltage, which is a different rated voltage from a previous rated output voltage of the power supply device, when the voltage level, detected by the voltage detection unit, is not the same as the rated voltage of the power receiving device; and a voltage-change-requesting unit configured to output a voltage change request signal to the power supply device through the first voltage change request port, the voltage-change-requesting unit comprising a switch mechanism for changing a bias level of the first voltage change request port based on the first control signal, and the power supply device being configured to be disconnected from the power receiving device and including:

a second USB connection port including a second voltage port, a second ground port, and a second voltage change request port for connection to the USB cable;

a device information recognition unit configured to detect the voltage change request signal received from the power receiving device through the second voltage change request port;

a second control unit configured to generate a second control signal for changing the rated voltage, which is the different rated voltage from the previous rated output voltage, according to the voltage change request signal input through the second voltage change request port;

an adapter information output unit configured to output information regarding a type of the power supply device to the power receiving device through the voltage change request port, wherein the type of the power supply device indicates that the power supply device is an output-voltage variable adapter; and an output-voltage-changing unit configured to change the voltage, which is the different rated voltage from the previous rated output voltage, according to the second control signal.

10. The power supply system of claim 9, wherein the voltage-change-requesting unit of the power receiving device and the device information recognition unit of the power supply device are connected through a USB data line, and the device information recognition unit is configured to detect a voltage level of the USB data line.

11. The power supply system of claim 9, wherein the power receiving device further includes an adapter connection switch configured to perform two-way communication with the power supply device through a USB data line.

12. The power supply system of claim 11, wherein the adapter connection switch is configured to selectively connect $V_{DATA+}$ and $V_{DATA-}$ signal of the first control unit to the first voltage change request port.

13. The power supply system of claim 11, wherein the adapter connection switch is configured to selectively connect the voltage-change-requesting unit to the first voltage change request port.

14. A control method of a power supply device, the control method comprising:

confirming whether a power receiving device, which is configured to be selectively disconnected from the power supply device, is connected to the power supply device at a first time and a second time that is earlier than the first time;

determining a power supply specification based on whether the power receiving device is connected to the power supply device at the first time and whether the power receiving device is connected to the power supply device at the second time; and supplying power based on the power supply specification, wherein the power supply specification is determined based on a device information recognition signal when the power receiving device is connected to the power supply device at the first time and connected or disconnected at the second time, wherein the determining the power supply specification includes obtaining the voltage change request signal to change the power supply specification when the power receiving device is connected to the power supply device at the first time and disconnected at the second time, and the device information recognition signal is a voltage change request signal transmitted through a voltage change request port of the power receiving device and a voltage change request port of the power supply device.

15. The control method of claim 14, wherein the determining a power supply specification includes:

maintaining the power supply specification when the power receiving device is connected to the power supply device at the first time and at the second time.

* * * * *